United States Patent Office 3,031,420
Patented Apr. 24, 1962

3,031,420
HYDROCARBON REFORMING CATALYST
Harvey D. Schindler and Leonard A. Cullo, Norwalk, and John M. Witheford, Stamford, Conn., assignors to American Cyanamid Company, New York, N.Y., a corporation of Maine
No Drawing. Filed Jan. 28, 1959, Ser. No. 789,524
6 Claims. (Cl. 252—465)

This invention relates to improvements in hydrocarbon reforming catalysts of the type in which molybdenum oxide, with or without other metal oxides or metals, is supported on an alumina carrier. The invention has as its principal object an improvement in the activity of catalysts of this type by calcining and leaching the alumina carrier and then impregating it with the activating metal oxide or oxides as will hereinafter be more fully described.

Catalysts consisting essentially of molybdenum oxide on active alumina are now in wide commercial use for hydroforming light petroleum fractions. Catalysts of the same general type containing nickel oxide or cobalt oxide in addition to molybdenum oxide are used for decomposing organic sulfur compounds in petroleum hydrocarbons in the presence of hydrogen. It has generally been considered that the most active catalysts for these purposes are obtained by precipitating the metal oxides or their precursors on a wet alumina gel followed by dehydration and calcining to convert the hydrated alumina into an aluminum oxide which is usually the gamma form of alumina.

Our present invention is based on the discovery that highly active catalysts of this type can be prepared from carriers produced by first dehydrating hydrated alumina by calcining it at about 1000°–1500° F. and then leaching it with an acid until a substantial proportion of alumina has been removed. The pretreated alumina is then impregnated with precursors of the desired catalytic metal oxides such as ammonium molybdate, cobalt nitrate, nickel nitrate and the like and is then heated to convert these componuds into the metal oxides.

The hydrated aluminas used to prepare catalyst carriers may be obtained by any suitable procedure. One method in general use consists in precipitating aluminum hydroxide from a water solution of water-soluble aluminum compound such as aluminum sulfate, aluminum chloride or an alkali metal aluminate such as sodium or potassium aluminate. The precipitate is usually washed free from salts and other impurities and is then dried, calcined at 1000°–1500° F. for at least 30 minutes and is then preferably ground and shaped into pellets before leaching with an acid. Sol-type alumina prepared by digesting amalgamated aluminum with dilute aqueous acetic solutions, as described in U.S. Patent No. 2,274,634, may also be calcined at the same temperatures and leached, with or without preforming into beads, pellets or other shapes.

The calcined alumina is leached by contacting it with an aqueous solution of an acid capable of attacking aluminum oxide and converting it into a water-soluble aluminum salt. The most suitable acids are strong mineral acids such as nitric acid, sulfuric acid, hydrochloric acid and the like. Organic acids such as acetic acid may be used, but are considerably less desirable. The strength of the acid is not critical, but the most suitable range is from about 0.5 to 5 Normal. The leaching is preferably carried out by suspending the alumina in the aqueous acid while maintaining temperatures of about 30°–50° C. for a time sufficient to remove from about 2% to about 15% by weight.

After the alumina has been leached with acid to the desired extent it is preferably washed with water. When nitric acid is used as the leaching agent this washing does not have to be complete, since any nitrate remaining in the alumina can be decomposed to the oxide by a subsequent calcination. When other mineral acids are used the leaching is preferably continued until the pH of the wash water leaving the alumina is 4.6 or higher. The leached and washed alumina is then oven-dried and may be impregnated with molybdenum oxide and other activating metal oxides either directly or after a second calcination at 1000°–1500° F.

The leached alumina carrier may be impregnated with molybdenum oxide, with or without oxides of nickel, cobalt or other activating metal, by any desired impregnating procedure. Preferably the leached, dried and calcined carrier is sprayed with an aqueous ammonium molybdate solution, which may contain a dissolved cobalt or nickel salt, using a sufficient quantity of the impregnating solution to fill the pores of the leached alumina, followed by drying and calcining to convert the metal compounds to their oxides. Another suitable impregnation procedure consists in suspending the pellets, beads or other shaped forms of the calcined and leached alumina in an ammoniacal solution of ammonium molybdate and a cobalt salt such as cobalt nitrate, or of ammonium molybdate and a nickel salt such as the carbonate, followed by draining off the excess impregnating solution and drying and calcining the beads or pellets.

The quantity of molybdenum oxide to be applied to the calcined and leached aluminum oxide carrier may be varied through a wide range, depending on the final use for which the catalyst is intended. For most purposes the quantity of molybdenum oxide will range from about 5% to 25% on the weight of the finished catalyst. The quantity of nickel oxide, cobalt oxide or other activating metal oxide, if used, is generally on the order of about 1% to 5% on the weight of the finished catalyst, but may be somewhat higher with larger proportions of molybdenum oxide. A typical hydroforming catalyst may contain from about 7% to about 20% by weight of $MoO_3$ on from 93% to 80% of calcined and leached $Al_2O_3$. A typical hydrodesulfurization catalyst may contain about 10% to 25% by weight of $MoO_3$ and about 1% to 5% of NiO or CoO, the balance being the calcined alumina.

The invention will be further described and illustrated by the following specific examples to which, however, it is not limited.

*Example 1*

Precipitated alumina was prepared by adding separate streams of sodium aluminate and aluminum sulfate solutions to a turbine-agitated strike tank containing a heel of water at rates such as to maintain a pH of 7.0 while holding the temperature at about 115°–125° F. The resulting slurry was filtered and the filter cake was freed from salts by washing with water, repulped in water to 7% solids, aged 30 minutes and again filtered and washed to an Na2O content of less than 0.03%. It was again suspended in water and the slurry was spray dried in a current of hot gas having an inlet temperature of 500°–600° F.

The spray-dried powder was mixed with about 1% of graphite and made into ⅛-inch diameter pellets by extrusion. The raw pellets were calcined by heating to 1400° F. and holding at this temperature for about one hour. Their apparent density was 0.79 gram per cubic centimeter.

An impregnating solution was prepared by dissolving 37 grams of ammonium molybdate and 10.8 grams of nickel carbonate in 100 cc. of 28% ammonium hydroxide and divided into two equal parts. One part was sprayed on 82 grams of the calcined pellets which were then again calcined at 1100° F. for one hour to produce an unleached catalyst containing 15% of $MoO_3$ and 3% of NiO.

A portion of the batch of calcined pellets was leached by stirring with aqueous nitric acid in a glass beaker using 300 cc. of acid containing 37 grams of $HNO_3$ for each 100 grams of the $Al_2O_3$ pellets. The leaching was continued for one hour at 40°–50° C. after which the acid was drained and the pellets were washed with water until the pH of the wash water was 4.6. They were then dried and calcined by heating to 1100° F. during about 3 hours and holding at this temperature for an additional one hour. The loss in weight of the pellets due to leaching was 10%; the apparent density of the leached and calcined pellets was 0.74 gram per cc. An 82 gram portion of these pellets was impregnated with 15% $MoO_3$ and 3% NiO by spraying with the remainder of the ammoniacal solution and the impregnated pellets were again calcined at 1100° F.

The activity of hydrodesulfurization catalysts of this type is measured by the following test. A reactor is charged with a measured volume of the catalyst pellets and a West Texas gas oil containing 1.2% of sulfur is passed through it in admixture with hydrogen at a temperature of 700° F. and a velocity of 10 volumes per hour per volume of catalyst using 7500 s.c.f. of hydrogen per barrel of oil. When the unleached catalyst described above was used in this test, 82% of the sulfur was removed from the oil while the leached catalyst removed 85% of the sulfur.

*Example 2*

Spray-dried alumina, prepared as described in Example 1, was extruded into 1/16-inch pellets which were calcined at 1400° F. for 45 minutes and leached for one hour at 40°–50° C. using 3 parts of 2 Normal aqueous nitric acid for each part of $Al_2O_3$. After washing with water, drying and calcining at 1100° F. the carrier was impregnated with NiO and $MoO_3$ by spraying it with an ammoniacal solution of the promoters as described in Example 1. After calcining the catalyst had the following characteristics:

| | |
|---|---|
| Crush strength_____lbs__ | 15 |
| Apparent bulk density_____grams per cc__ | 0.74 |
| Pore volume_____cc. per gram__ | 0.52 |
| Surface area_____sq. meters per gram__ | 202 |
| NiO content_____percent__ | 3.1 |
| $MoO_3$ content_____do____ | 14.9 |

When tested by the procedure described in Example 1 this catalyst removed 85% of the sulfur from the West Texas gas oil.

*Example 3*

Extruded pellets of precipitated alumina, one-eighth inch in diameter, were oven dried at 200° F. and calcined at 1400° F. for one hour. Three pounds of the calcined pellets were leached by agitation with 12 pounds of a 9.5% $HNO_3$ solution at 40°–50° C. for one hour and were then washed with water until an effluent pH of 4.6 was attained. The loss in weight from the leaching and washing was about 10%. The washed extrudates were re-dried at 200° F. and were then calcined by heating to 1100° F.

One pound of the leached alumina carrier was sprayed with 340 cc. of a solution containing 67 grams of cobalt nitrate hexahydrate and 104 grams of ammonium molybdate and was then oven-dried and calcined to 1100° F. The finished catalyst contained 3% of CoO, 15% $MoO_3$ and 82% $Al_2O_3$ and had a pore volume of 0.75 cc. per gram. The pore volume of the calcined pellets before leaching was 0.68–0.70 cc. per gram. When tested in the hydrodesulfurization process described in Example 1 the sulfur removal was 83%.

*Example 4*

Another portion of the calcined alumina of Example 3 was leached as described in that example, dried and calcined at 1400° F., and impregnated with molybdenum oxide using 1.32 pounds of an aqueous solution containing 10.3% of ammonium molybdate for each pound of the alumina. The amount of solution was just sufficient to fill the alumina pore volume of 1.32 cc. per gram and the final composition of the catalyst, after calcining by heating to 1100° F., was 10% $MoO_3$ and 90% $Al_2O_3$.

What we claim is:

1. A method of producing an improved hydrocarbon reforming catalyst which comprises calcining alumina at 1000°–1500° F. for at least 30 minutes and then leaching it with an acid until between about 2 and about 15% by weight of alumina has been removed, impregnating the leached alumina with a quantity of a molybdate equivalent to about 5–25% of $MoO_3$ on the weight of the finished catalyst and heating the impregnated alumina to convert the molybdate to molybdenum oxide.

2. A method of producing an improved hydrodesulfurization catalyst which comprises calcining alumina at 1000°–1500° F. for at least 30 minutes and then leaching it with an acid until between about 2 and about 15% by weight of alumina has been removed, impregnating the leached alumina with a molybdate and a nickel salt in quantities equivalent to about 5–25% of $MoO_3$ and 1–5% of NiO on the weight of the finished catalyst and heating the impregnated alumina to convert the molybdate and nickel salt to molybdenum oxide and nickel oxide respectively.

3. A method of producing an improved hydrodesulfurization catalyst which comprises calcining alumina at 1000°–1500° F. for at least 30 minutes and then leaching it with an acid until between about 2 and about 15% by weight of alumina has been removed, impregnating the leached alumina with a molybdate and a cobalt salt in quantities equivalent to about 2–25% of $MoO_3$ and 1–5% of CoO on the weight of the finished catalyst and heating the impregnated alumina to convert the molybdate and cobalt salt to molybdenum oxide and cobalt oxide respectively.

4. A hydrocarbon reforming catalyst comprising a major portion of a carrier impregnated with about 5–25% by weight of molybdenum oxide, said carrier being prepared by calcining alumina at 1000°–1500° F. for at least 30 minutes and then leaching it with an acid until between about 2 and about 15% by weight of alumina has been removed.

5. A hydrodesulfurization catalyst comprising a major portion of a carrier impregnated with about 5–25% by weight of molybdenum oxide and about 1–5% by weight of nickel oxide, said carrier being prepared by calcining alumina at 1000°–1500° F. for at least 30 minutes and then leaching it with an acid until between about 2 and about 15% by weight of alumina has been removed.

6. A hydrodesulfurization catalyst comprising a major portion of a carrier impregnated with about 5–25% by weight of molybdenum oxide and about 1–5% by weight of cobalt oxide, said carrier being prepared by calcining alumina at 1000°–1500° F. for at least 30 minutes and then leaching it with an acid until between about 2 and about 15% by weight of alumina has been removed.

References Cited in the file of this patent

UNITED STATES PATENTS

| | | |
|---|---|---|
| 2,723,947 | Oblad | Nov. 15, 1955 |
| 2,768,125 | Ashley | Oct. 23, 1956 |
| 2,769,688 | Milliken | Nov. 6, 1956 |
| 2,887,455 | Cornelius | May 19, 1959 |